(12) United States Patent
Houston et al.

(10) Patent No.: US 9,871,446 B2
(45) Date of Patent: Jan. 16, 2018

(54) CURRENT MODE CONTROL REGULATOR WITH LOAD RESISTOR EMULATION

(71) Applicant: INTERSIL AMERICAS LLC, Milpitas, CA (US)

(72) Inventors: M. Jason Houston, Cary, NC (US); Eric M. Solie, Durham, NC (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 0 days.

(21) Appl. No.: 15/062,387

(22) Filed: Mar. 7, 2016

(65) Prior Publication Data

US 2016/0352227 A1 Dec. 1, 2016

Related U.S. Application Data

(60) Provisional application No. 62/169,209, filed on Jun. 1, 2015, provisional application No. 62/270,874, filed on Dec. 22, 2015.

(51) Int. Cl.
*H02M 3/158* (2006.01)
*H02M 1/08* (2006.01)
(Continued)

(52) U.S. Cl.
CPC .............. *H02M 3/158* (2013.01); *G06F 1/26* (2013.01); *H02M 1/08* (2013.01); *H02J 7/007* (2013.01);
(Continued)

(58) Field of Classification Search
CPC ......... H02M 3/158; H02M 2001/0032; H02M 3/156; H02M 2001/0025;
(Continued)

(56) References Cited

U.S. PATENT DOCUMENTS 6,377,032 B1 * 4/2002 Andruzzi ............ H02M 3/1588
323/224
7,145,317 B1 * 12/2006 Shah .................... H02M 3/156
323/288
(Continued)

OTHER PUBLICATIONS

Chang, Ji-Soo et al. "Fast Output Voltage-Regulated PWM Buck Converter With an Adaptive Ramp Amplitude Control." *IEEE Transactions on Circuits and Systems II: Express Briefs*. vol. 60, No. 10, Oct. 2013, pp. 712-716.
(Continued)

*Primary Examiner* — Gustavo Rosario Benitez
(74) *Attorney, Agent, or Firm* — Foley & Lardner LLP; Mark J. Danielson

(57) ABSTRACT

A current mode control regulator including a control circuit and a current generator. The control circuit regulates an output voltage based on a reference voltage using current mode control. The current generator applies an adjust current to a feedback current signal, in which the adjust current is proportional to a difference between a voltage indicative of the output voltage and the reference voltage to emulate an AC load resistance at an output of the current mode regulator. A load resistor emulator emulates an AC load resistor to increase the phase margin of current mode control regulator when operating without a battery coupled to the output, such as when the battery is physically removed or otherwise electrically disconnected. Operation is not substantially changed when the battery is connected, so that the desired phase margin is achieve with or without the battery.

9 Claims, 3 Drawing Sheets

(51) Int. Cl.
  *G06F 1/26*  (2006.01)
  *H02M 1/00*  (2006.01)
  *H02M 3/156*  (2006.01)
  *H02J 7/00*  (2006.01)
  *H02J 7/02*  (2016.01)

(52) U.S. Cl.
  CPC .............. *H02J 7/022* (2013.01); *H02M 3/156* (2013.01); *H02M 2001/0009* (2013.01); *H02M 2001/0032* (2013.01); *Y02B 70/16* (2013.01)

(58) Field of Classification Search
  CPC . H02M 2003/1566; H02M 2001/0009; H02M 1/08; H02J 7/007; G06F 1/26
  See application file for complete search history.

(56) References Cited

U.S. PATENT DOCUMENTS

| | | | | |
|---|---|---|---|---|
| 2005/0184717 | A1* | 8/2005 | Walters ............... | H02M 3/1584 323/284 |
| 2009/0140711 | A1* | 6/2009 | Philbrick .............. | H02M 3/158 323/285 |
| 2009/0146634 | A1* | 6/2009 | Audy .................... | H02M 3/156 323/290 |
| 2010/0270995 | A1* | 10/2010 | Laur ..................... | H02M 3/156 323/285 |
| 2011/0260703 | A1* | 10/2011 | Laur ................... | H02M 3/1563 323/271 |
| 2012/0212204 | A1* | 8/2012 | Philbrick .............. | H02M 3/156 323/284 |
| 2015/0067358 | A1* | 3/2015 | Philbrick .............. | H02M 3/158 713/300 |
| 2016/0105110 | A1* | 4/2016 | Houston ............. | H02M 3/1582 323/271 |

OTHER PUBLICATIONS

Choi, Kyusik et al. "Load Current-Sensor-Less Feed-Forward Method for Fast Load Transient Response using Digital Control." IEEE 2013 pp. 2769-2772.

Cortes, Jorge et al. "Improved Transient Response of Controllers by Synchronizing the Modulator with the Load Step: Application to $V^2I_c$." *IEEE Transactions on Power Electronics*. vol. 30, No. 3, Mar. 2015 pp. 1577-1590.

\* cited by examiner

CURRENT MODE CONTROL REGULATOR WITH LOAD RESISTOR EMULATION

CROSS-REFERENCE TO RELATED APPLICATIONS

This application claims the benefit of U.S. Provisional Application Ser. No. 62/169,209, filed on Jun. 1, 2015, and 62/270,874, filed Dec. 22, 2015, both of which are hereby incorporated by reference in their entireties for all intents and purposes.

BRIEF DESCRIPTION OF THE DRAWINGS

The benefits, features, and advantages of the present invention will become better understood with regard to the following description and accompanying drawings, in which.

DETAILED DESCRIPTION

A regulator configured to provide power to a system load and to charge a battery can operate without the battery. The regulator used for battery charger applications is often implemented using current mode control to simplify control loop compensation. A challenging problem with current mode control is that the current feedback loop incorporates the AC (alternating current) information of the output inductor-capacitor (LC) filter of the regulator. When the battery is connected, the internal resistance of the battery presents an AC load resistor that increases the phase margin to help stabilize control operation. When the battery is electrically disconnected from the output, however, the phase margin decreases.

A load resistor emulator as described herein emulates an AC load resistor to increase the phase margin of current mode control regulator when operating without the battery, such as when the battery is physically removed or otherwise electrically disconnected. Operation is not substantially changed when the battery is connected, so that the desired phase margin is achieve with or without the battery.

Figure 1:
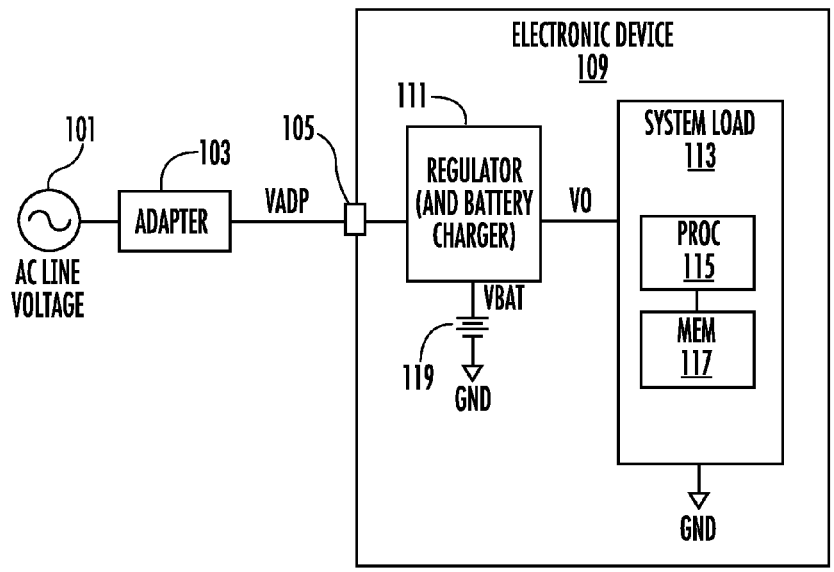
FIG. 1 is a simplified block diagram of an electronic device including a regulator implemented according to one embodiment including load resistor emulation.

FIG. 1 is a simplified block diagram of an electronic device 109 including a regulator 111 implemented according to one embodiment including load resistor emulation as further described herein. The regulator 111 incorporates battery charger functions for charging a rechargeable battery 119. An AC line voltage shown at 101 is provided to the input of a power adapter 103, which converts the AC voltage to a DC adapter voltage VADP. The voltage level of VADP and the current capacity of the power adapter 103 should be suitable for providing sufficient power to the electronic device 109. Many different types of electronic devices are contemplated.

VADP is shown provided by a suitable connection 105 to provide VADP to an input of the regulator 111, which provides an output voltage VO to a system load 113. The rechargeable battery 119 provides a battery voltage VBAT to another input of the power interface 111 for developing VO when the adapter 103 is not available. The battery 119 and the system load 113 are shown referenced to ground (GND), where is it understood that GND generally represents any suitable positive or negative voltage level and/or multiple ground types, such as power ground, signal ground, analog ground, chassis ground, etc.

The electronic device 109 may be any type of electronic device, including mobile, portable, or handheld devices, such as, for example, any type of personal digital assistant (PDA), personal computer (PC), portable computer, laptop computer, etc., cellular phone, personal media device, etc. The primary functions of the electronic device 109 are performed by the system load 113, which may include one or more different system load elements. In the illustrated embodiment, the system load 113 includes a central processing unit (CPU) or processor 115, such as a microprocessor or controller or the like, which is coupled to any combination of any type of memory 117 commonly used for electronic devices, such as various types and configurations of random access memory (RAM) and read-only memory (ROM) and the like.

In one embodiment, the battery 119 may be physically removed from the electronic device 109. When the battery 119 is physically present and electrically connected to the electronic device 109, the regulator 111 may operate as a battery charger to charge the battery 119 until it is fully charged. When fully charged, the battery 119, even if physically present, may be electrically disconnected from the regulator 111 (such as by an electronic switch or the like).

Figure 2:
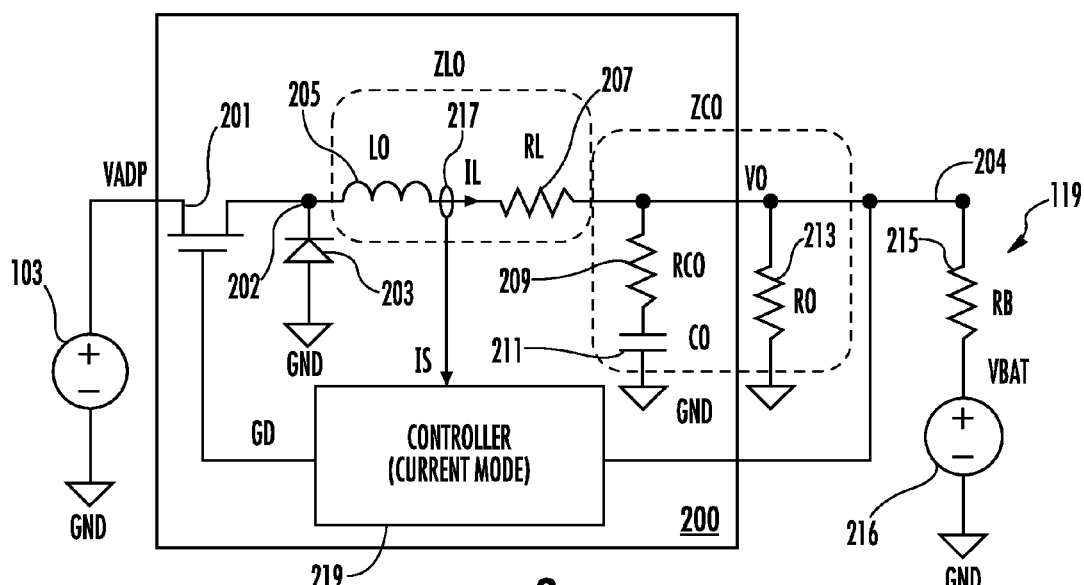
FIG. 2 is a schematic diagram of a conventional regulator that may be used as the regulator of FIG. 1, in which the regulator is coupled to the power adapter and the battery and implemented as a narrow voltage direct current (NVDC) charger with an output resistance RO that represents an equivalent load resistance at the output of the regulator of FIG. 1.

FIG. 2 is a schematic diagram of a conventional regulator 200 implemented as a narrow voltage direct current (NVDC) charger coupled to the power adapter 103, the battery 119, and an output resistor 213 with resistance RO that represents an equivalent load resistance at the output of the regulator 200. The output resistor RO, for example, represents the load presented by the system load 113. The power adapter 103 develops VADP, which is provided to one current terminal of an electronic switch 201. The other current terminal of the electronic switch 201 is coupled to a phase node 202, which is coupled to the cathode of a diode 203 and to one end of an output inductor 205 with inductance LO. The other end of the diode 203 is coupled to GND. The diode 203 operates as an asynchronous switch for a buck regulator configuration. The other end of the output inductor 205 is coupled to one end of a resistor 207 with resistance RL, having its other end coupled to an output node 204 developing the output voltage VO. The resistor 207 is not a physical resistor but instead represents the internal parasitic impedance of the output inductor 205.

The output node 204 is further coupled to one end of a resistor 209 with resistance RCO and to one end of the resistor 213. The other end of the resistor 209 is coupled to one end of an output capacitor 211 with capacitance CO. The other ends of the output capacitor 211 and resistor 213 are coupled to GND. The resistor 209 is not a physical resistor but instead represents the equivalent series resistance (ESR) or parasitic resistance of the output capacitor 211. The output node 204 is coupled to the positive terminal of the battery 119, having its negative terminal coupled to GND. As shown, however, the battery 119 is represented as a resistor 215 in series with a voltage source 216, in which the resistor 215 represents the internal series resistance RB of the battery 119 and the voltage source develops the battery voltage VBAT.

A current sensor 217 senses the current through the output inductor 205 and provides a current sense signal IS to an input of a controller 219. The controller 219 has another input coupled to the output node 204 for receiving the output voltage VO, and has an output providing a gate drive signal GD which is provided to the control input of the electronic switch 201. In one embodiment, the electronic switch 201 is configured as a field-effect transistor (FET) or a MOS transistor or the like, although alternative switch configurations and implementations are contemplated. The output inductor 205 and the resistor 217 collectively form an impedance parameter ZLO. The resistors 209 and 213 and the output capacitor 211 collectively form an output impedance parameter ZCO.

Figure 3:
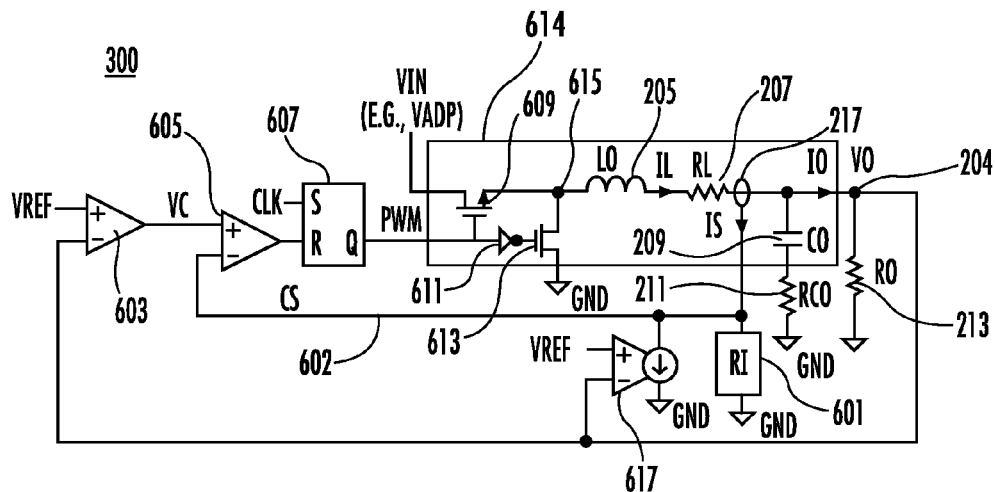
FIG. 3 is a schematic and block diagram of a regulator with load resistor emulation implemented according to one embodiment which may be used as the regulator of FIG. 1.

In an alternative embodiment similar to that shown in FIG. 3, a synchronous switch (e.g., another electronic switch similar to the electronic switch 201) may replace the diode 203. When a synchronous switch is used, the controller 219 turns on the electronic switch 201 and turns off the synchronous switch in a first portion of each cycle, and then turns off the electronic switch 201 and turns on the synchronous switch during normal operation. Diode emulation may be used, such as during low power operation, in which the synchronous switch is turned off early in the cycle as understood by those of ordinary skill in the art.

The controller 219 is illustrated as a current mode controller in which the current IL flowing through the output inductor LO is detected and used to generate a pulse width modulation (PWM) signal (e.g., FIG. 3) within the controller 219. The PWM signal toggles between first and second states for controlling switching action, in which the first state may be an active state to assert GD to turn on the electronic switch 201 for driving current to the output circuit, and an inactive state for pulling current from the output circuit. The PWM signal is used to develop GD for switching the electronic switch 201 (and a synchronous switch if provided). The output voltage VO is detected, either directly or indirectly through a sense circuit (not shown), and is compared with a reference voltage (e.g., VREF, FIG. 3) representing the target voltage level of VO to develop a control or error signal (e.g., VC, FIG. 3). The control signal and a signal indicative of the inductor current IL (e.g., IS) is used to toggle or transition the PWM signal to control switching of current through the inductor 205 while regulating the output voltage VO. Many methods are available for detecting the inductor current IL, such as directly using a current sensor (resistive or inductive), or indirectly such as by sensing the voltage across RL. Another method as described herein is to synthetically detect inductor current by converting voltage applied across the output inductor 205 to currents applied to a ramp capacitor as further described herein.

The current control loop contains information from ZLO+ZCO. ZCO may be determined according to the following equation (1):

$$ZCO = RO\frac{s(RCO)(CO)+1}{s(RCO+RO)CO+1} \quad (1)$$

ZLO may be determined according to the following equation (2):

$$ZLO = sLO + RL \quad (2)$$

The impedance parameters ZLO and ZLC form an output LC filter that presents a double pole for purposes of loop compensation. When voltage mode control is used, the double LC poles are closer together presenting a significant compensation challenge. When current mode control is used, the double LC pole is split into a low frequency pole and a high frequency pole. In this manner, compensation is simplified for current mode control since it generally has to compensate for only one pole. For this reason, battery charger applications typically use current mode control. As further described herein, however, the feedback current information in the current control loop contains AC information from the output LC filter which includes the output inductor 205 and the output capacitor CO.

Gain and phase versus frequency for the impedance parameter ZCO+ZLO for different values of the output resistance RO, along with gain and phase versus frequency for the current control loop of the regulator 200 as depicted in FIG. 2 for the same values of the output resistance RO without loop compensation, reveal that very low output impedance provides improved response with high phase margin. A larger resistance value of RO makes the load more capacitive which moves the ZCO pole to a lower frequency. A larger load resistance causes significant phase shift at low frequencies. Battery chargers often operate with loop bandwidths in the frequency range of the low frequency pole.

Empirical results for the current control loop of the regulator 200 as depicted in FIG. 2 have been used to compare phase margin when the battery 119 is connected (with battery) and when it is not connected (without battery). These results illustrate that the mode without the battery 119 has less phase margin, and that the battery 119, when connected, boosts the phase margin by a significant amount. In one embodiment, for example, the phase margin may be improved by 30-40 degrees when the battery 119 is connected. The internal resistance RB of the battery 119 increases the AC load to the regulator 200 to improve the phase margin.

A load resistor emulator as described herein emulates an AC load resistance to improve the phase margin of the regulator 200. The load resistor emulator improves the phase margin which is particularly beneficial when the battery 119 is not connected. When the battery 119 is connected, circuit parameters are not significantly changed so that the phase margin remains significantly improved as compared to circuits without the load resistor emulator. The controller 219 may be provided on a chip or integrated circuit (IC), in which the AC load battery emulation is generated on-chip.

FIG. 3 is a schematic and block diagram of a regulator 300 implemented according to one embodiment which may be used as the regulator 111 of FIG. 1, which is shown coupled to the output resistor 213 with resistance RO representing an output load such as the system load 113. The regulator 300 is also implemented as a narrow voltage direct current (NVDC) charger with an output resistance RO similar to the regulator 200 depicted in FIG. 2, but with the battery 119 removed and further including load resistor emulation according to one embodiment. The output portion, which includes the output inductor 205 (including the internal resistor 207 with resistance RL), the current sensor 217, the capacitor 209 and the resistors 211 and 213, are shown coupled in similar manner as the regulator 200. An output current IO is shown provided to the output resistor 213

(RO). An input voltage VIN (such as the adapter voltage VADP) is provided to a current terminal of an electronic switch 609, having its other current terminal coupled to a phase node 615. The phase node 615 is coupled to one end of the output inductor 205 and to one current terminal of an electronic switch 613. The other current terminal of the electronic switch 613 is coupled to GND. The PWM signal is provided to control the control terminals of electronic switches 609 and 613. An inverter 611 is interposed between PWM and the control terminal of the electronic switch 613, representing that the electronic switches 609 and 613 are switched out of phase relative to each other. The electronic switches 609 and 613, the output inductor 205 and the output capacitor 209 generally form a voltage converter 614 that converts the input voltage to the output voltage as controlled by the PWM signal. The regulator 300 is shown including the converter 614 configured as a buck type converter, in which it is understood that the regulator 300 may be configured according to other converter architectures, such as a boost converter or a buck-boost converter or the like.

A sense resistor 601 is coupled between a sense node 602 and GND. A current detector includes the current sensor 217 providing the sense current IS to the sense resistor 601 via the sense node 602, in which the sense resistor 601 develops a current sense voltage CS on node 602. VO, or a sensed version thereof, is fed back to an inverting (negative) input of an error amplifier 603, which receives a reference voltage VREF at its non-inverting (positive) input. Although not shown, VO may be provided to a resistive voltage divider to apply a corresponding output sense voltage rather than VO. VREF has as voltage level that is or otherwise represents the target voltage level for the output voltage VO, which may have a voltage level indicative of the target voltage level of VO or its sensed version. Although not shown, the error amplifier 603 may include compensation components for compensating the loop. The output of the error amplifier 603 provides a control signal VC, which is provided to a positive input of a comparator 605. CS is provided to the negative input of the comparator 605, which has its output coupled to a reset (R) input of a set-reset (SR) latch 607. The set (S) input of the SR latch 607 is shown receiving a clock signal CLK. The Q output of the SR latch 607 provides the PWM signal to control the control terminals of electronic switches 609 and 613.

It is appreciated that the diagram is simplified, in which additional circuitry may be provided for driving the gates of the electronic switches 609 and 613. For example, drive circuitry may be provided to turn on and off the switches with sufficient drive capacity. Dead time control may be implemented to ensure that the switches 609 and 613 are not turned on at the same time during each switching cycle. Also, diode emulation may be implemented, such as during low output power operation, in which switch 613 is turned off early each cycle (or not even turned on) in which both switches are turned off for a period of time during successive switching cycles.

In operation of the regulator 300, when PWM is high, the electronic switch 609 is turned on while the electronic switch 613 is turned off. Current flows from VIN through the output inductor 205 to charge the output capacitor CO and provide current to the output load (represented as RO) and/or to charge the battery 119 (not shown connected). While the electronic switch 609 is turned on, the inductor current IL ramps up which causes CS to ramp up accordingly. When CS rises above VC, the comparator 605 switches to reset the SR latch 607 so that PWM is pulled low. When PWM is low, the electronic switch 613 is turned on while the electronic switch 609 is turned off. The inductor current IL ramps down which causes CS to ramp down accordingly. Eventually, a rising edge on CLK sets the SR latch 607 pulling PWM back high, and operation repeats in successive cycles.

It is desired to provide an AC resistance from VO to GND to emulate an AC load resistance, which is particularly advantageous when the battery 119 is removed. VREF may be used as an AC ground reference. AC resistance, therefore, may be referenced from VO to VREF. A step up in the load, or a load transient, results in a reduction of VO. Current flows from VREF to VO until VO returns back to the level of VREF. This behavior may be emulated by a transconductance amplifier 617, having its positive input receiving VREF, its negative input receiving VO, and its output driving a current from node 602 to GND. The transconductance amplifier 617 develops a current proportional to the difference between VREF and VO, or gm*(VREF−VO) in which "gm" is a transconductance gain of the transconductance amplifier 617. The transconductance amplifier 617 adjusts the gain of the feedback loop, which in turn adjusts the gain of the forward loop of the regulator 111. The transconductance amplifier 617 forms a load emulator that improves the phase margin of the regulator 300.

Figure 4:
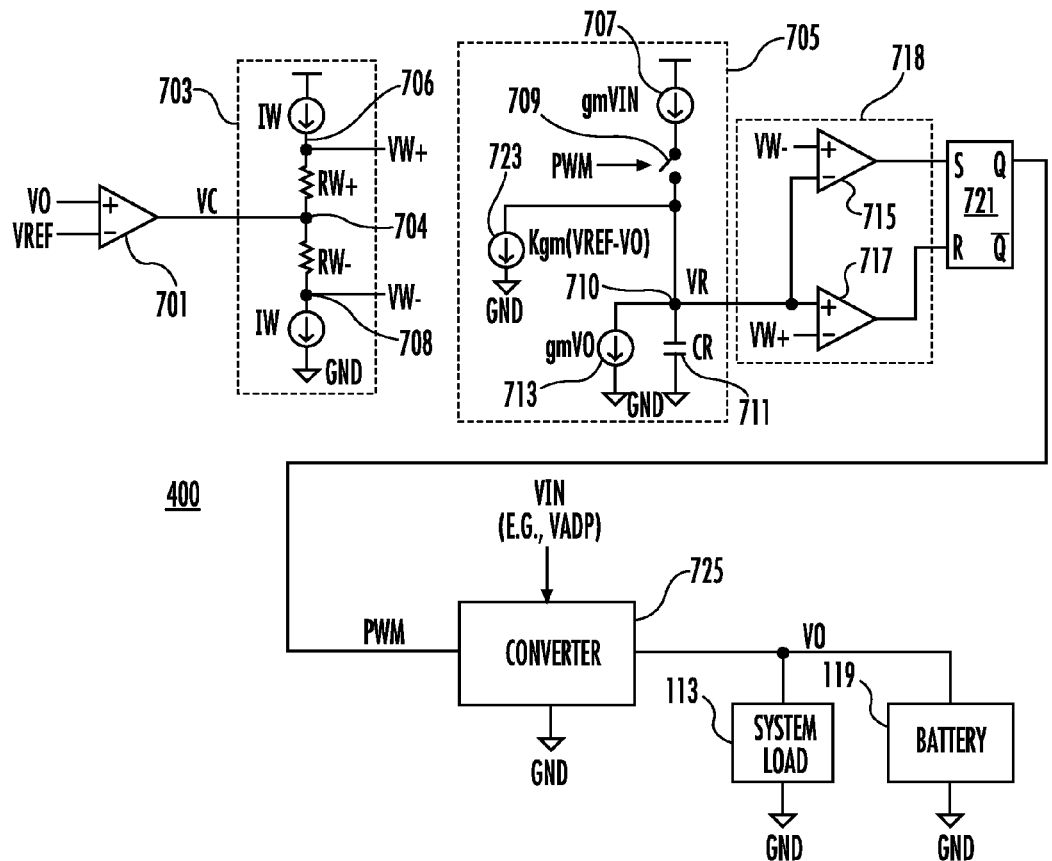
FIG. 4 is a schematic diagram depicting another regulator implemented as a current mode hysteretic controller with synthetic current information according to another embodiment which may also be used as the regulator of FIG. 1.

FIG. 4 is a schematic diagram depicting a regulator 400 implemented as a current mode hysteretic controller with synthetic current information according to another embodiment, in which the regulator 400 may also be used as the regulator 111 of FIG. 1 shown coupled to the system load 113 and the battery 119. VO and VREF are provided to respective inputs of an error amplifier 701, which outputs a control voltage VC. The control signal VC represents the relative error of the output voltage VO relative to VREF. Although not shown, the error amplifier 701 may include a compensation feedback circuit as understood by those of ordinary skill in the art. VC is provided to a voltage window circuit 703, which generates positive and negative window voltage polarities VW+ and VW−, respectively. As shown, VC is provided to a node 704 coupled between window resistors RW+ and RW−. The other end of the window resistor RW+ is coupled to a node 706, which is further coupled to a first current source developing window current IW for developing the positive window voltage polarity VW+ on node 706. The other end of the window resistor RW—is coupled to a node 708, which is further coupled to a second current source outputting the window current IW for developing the negative window voltage polarity VW− on node 708. In operation, the window current sources maintain the window current IW through both of the window resistors RW+ and RW− regardless of changes of the control voltage VC. Thus, the voltages VW+ and VW− follow the voltage level of VC while maintaining a constant window voltage between them, or VW+−VW−.

In this configuration, the regulator 400 includes a ramp generator 705 which synthetically replicates the inductor current LO though the output inductor 205. A transconductance amplifier 707 develops a current gmVIN, in which VIN is an input voltage such as VADP, and gm is a transconductance gain. The current gmVIN is provided to one terminal of a single-pole, single-throw (SPST) switch 709 having a control input receiving a PWM signal. The other end of the SPST switch 709 is coupled to a ramp node 710 developing a ramp voltage VR across a ramp capacitor 711 with capacitance CR, having its other end coupled to GND. Another transconductance amplifier 713 develops a sink current gmVO, which is pulled from the ramp node 710 to GND. The ramp node 710 developing VR is coupled to a negative input of a first PWM comparator 715 and to a positive input of a second PWM comparator 717, in which the first and second comparators 715 and 717 form a comparator circuit 718. VW− is provided to the positive input of the comparator 715 and VW+ is provided to the negative input of the comparator 717. The output of the comparator 715 is provided to the set input of an SR latch 721, and the output of the comparator 717 is provided to the reset input of the SR latch 717. The Q output of the SR latch 721 provides the PWM signal. Also, a transconductance amplifier 723 draws a current proportional to the difference between VREF and VO, or Kgm*(VREF−VO), where "K" is a gain factor.

The transconductance amplifiers 707, 713 and 723 are shown in simplified form as current devices. It is understood that they may be implemented similar to the transconductance amplifier 617 with voltage inputs and a suitable transconductance gain. The transconductance amplifier 707 may receive the input voltage VIN (or VADP) and GND at respective positive and negative inputs. The transconductance amplifier 713 may receive the output voltage VO and GND at respective positive and negative inputs. The transconductance amplifier 723 may receive the reference voltage VREF and the output voltage VO at respective positive and negative inputs.

PWM is provided to a converter 725 which converts the input voltage VIN (such as the adapter voltage VADP) to the output voltage VO. The system load 113 and the battery 119 are shown coupled between the output voltage VO and GND. The converter 725 may include a driver circuit (not shown) that controls switching of switching devices (similar to electronic switches 609 and 613), an output inductor (similar to the output inductor LO), and any other supporting circuit collectively used for voltage conversion.

In operation of the regulator 400, and temporarily ignoring the transconductance amplifier 723, the compensation circuit 701 drives VC based on the difference between VO and VREF, and the window voltages VW+ and VW− adjust accordingly (both following VC, which is centered between window voltage VW+ and VW−). When PWM is low, the switch 709 is opened so that the ramp capacitor 711 is discharged by the current proportional to the output voltage VO, or gmVO. When VR drops below the negative window voltage VW−, the PWM comparator 715 sets the SR latch 721 pulling PWM high. PWM going high closes the switch 709, so that the ramp capacitor 711 is now charged based on the difference between VIN and VO, or gm*(VIN−VOUT) assuming that VIN is greater than VO for a buck mode configuration. When VR rises above the positive window voltage VW+, the PWM comparator 717 resets the SR latch 721 to pull PWM back low. Operation repeats in this manner for regulating the output voltage VO based on VREF and the load level.

The ramp node 710 ramps up and down synthetically replicating the current IL through the output inductor 205 in a similar manner as the current sense voltage CS ramps up and down to track IL. VR is compared to VW+ and VW−, so that it ramps between the window voltage to control the PWM signal. The voltage window circuit 703 develops the window voltage between VW+ and VW− based on the control voltage VC. Current mode operation of the regulator 400 is similar to the regulator 300, in which CS ramps up and down and is compared directly to the control signal VC.

In the configuration of the regulator 400, the ramp node 710 generates a ramp voltage, which ramps up and down to control the PWM signal. The transconductance amplifier 723 forms a load emulator that emulates an AC resistance to GND by generating a current proportional to the difference between the voltages VO and VREF. The transconductance amplifier 723 adjusts the gain of the feedback loop, which in turn adjusts the gain of the forward loop of the regulator 400. In this manner, the operation of the transconductance amplifier 723 improves the phase margin of the regulator 400.

Figure 5:
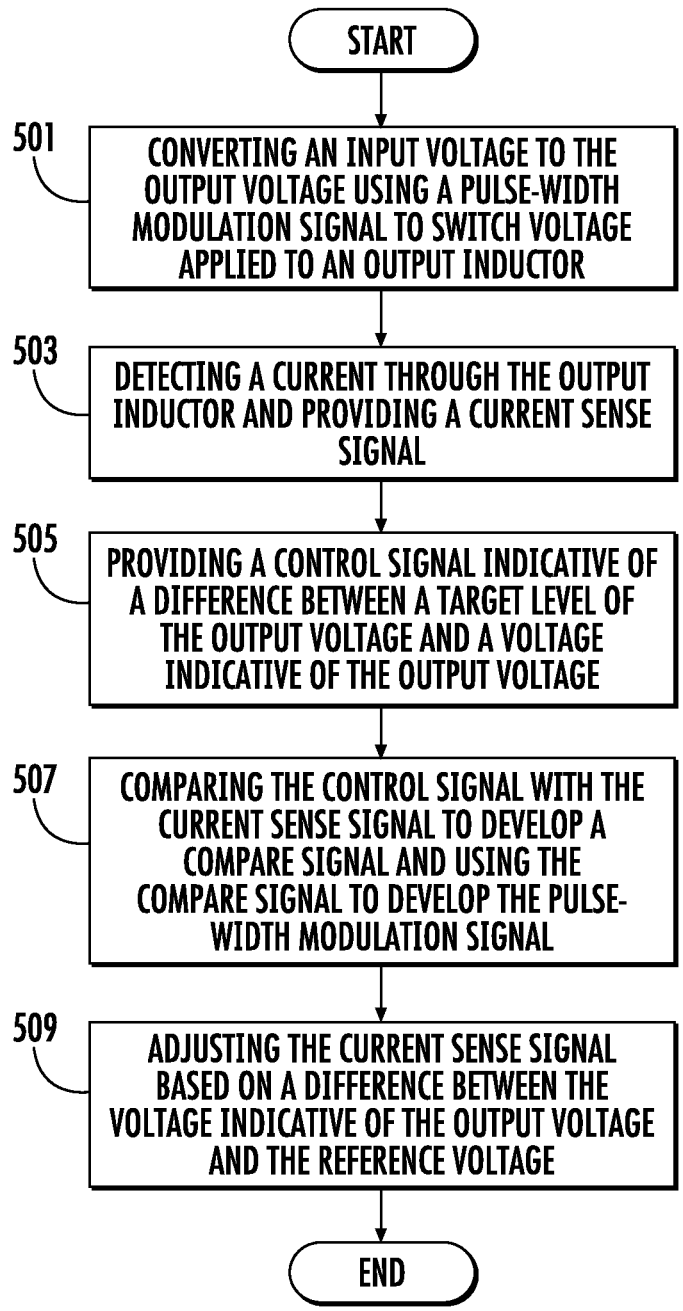
FIG. 5 is a flowchart diagram illustrating a method of regulating an output voltage using load resistor emulation according to one embodiment.

FIG. 5 is a flowchart diagram illustrating a method of regulating an output voltage using load resistor emulation according to one embodiment. At a first block 501, an input voltage is converted to an output voltage using a pulse-width modulation signal to switch voltage applied to an output inductor. This may be performed, for example, by the voltage converter 614 of the regulator 300 or the converter 725 of the regulator 400. At next block 503, a current through the output inductor is detected and a corresponding current sense signal is provided. At next block 505, a control signal indicative of a difference between a target level of the output voltage and a voltage indicative of the output voltage is provided. The error amplifiers 603 and 701 in the regulators 300 and 400, respectively, illustrate this function. At next block 507, the control signal is compared with the current sense signal to develop a compare signal, which is used to develop the pulse-width modulation signal. Finally at block 509, the current sense signal is adjusted based on a difference between the voltage indicative of the output voltage and the reference voltage. The transconductance amplifiers 617 or 723 may be used to perform this function as shown for the regulators 300 and 400.

The detecting of block 503 may be implemented using a current sensor providing current to a sense resistor such as shown for the regulator 300 (217 providing IS to 601). In the regulator 400, the current through the output inductor 205 is synthetically determined by developing a ramp voltage VR on a ramp node 710 that simulates current through the output inductor. In one embodiment, the ramp capacitor 711 is continuously discharged with current proportional to the output voltage VO, and in addition, is charged with a current proportional to the input voltage when PWM is active (such as by closing the switch 709). In the regulator 300, the comparing may be performed by the comparator 605 and the latch 607. In the regulator 400, positive and negative window voltages are developed above and below the control voltage VC, and the ramp voltage VR is compared with the window voltages for transitioning the PWM signal between its first and second states.

Results have demonstrated that the transient response when the battery 119 is not present is greatly improved by adding load resistor emulation. Results have further shown that there is little impact to the operation mode when the battery 119 is connected. By adding the load resistor emulation and selecting the appropriate value of K for a given configuration, the AC response when the battery 119 is disconnected is greatly improved. The value of K may be fixed in one embodiment, or the value of K may be adjustable for alternative embodiments. The value of K has little impact to the operating mode when the battery 119 is connected.

In summary, load resistor emulation as described herein provides improved stability performance without having to add external compensation. Load resistor emulation as described herein provides more consistent dynamic response with and without battery and load conditions.

The benefits, features, and advantages of the present invention are now better understood with regard to the foregoing description and accompanying drawings. The foregoing description was presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed. Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention as defined by the following claim(s).

The invention claimed is:

1. An electronic device comprising a regulator that provides a regulated output voltage to a load, wherein said regulator comprises:
   a converter that uses a pulse-width modulation signal to switch voltage applied to an output inductor to convert an input voltage to the regulated output voltage;
   a current detector that provides a current sense signal indicative of current through said output inductor;
   an error amplifier that receives a voltage indicative of the regulated output voltage, that receives a reference voltage indicative of a target level of the regulated output voltage, and that provides a control signal;
   a comparator circuit that uses said control signal and said current sense signal to develop said pulse-width modulation signal; and
   a load emulator that adjusts said current sense signal based on a difference between said voltage indicative of the regulated output voltage and said reference voltage, wherein said current detector comprises:
      a ramp capacitor coupled to a ramp node developing a ramp voltage;
      a first current generator that applies a current proportional to the regulated output voltage to said ramp node;
      a switch having a first switch terminal coupled to said ramp node, having a second switch terminal, and having a control terminal receiving said pulse-width modulation signal; and
      a second current generator that applies a current proportional said input voltage to said second switch terminal of said switch,
   and wherein said load emulator comprises a transconductance amplifier having a first input receiving said reference voltage, having a second input receiving said voltage indicative of the regulated output voltage, and having an output that applies an adjust current to said ramp node.

2. The electronic device of claim 1, further comprising:
   a window circuit that develops a positive window voltage that is greater than said control signal provided as a control voltage, and that provides a negative window voltage that is less than said control voltage;
   a latch circuit having a first input receiving a first latch signal, a second input receiving a second latch signal, and an output providing said pulse-width modulation signal; and wherein said comparator circuit comprises:
   a first comparator having a first input receiving said ramp voltage, a second input receiving said negative window voltage, and an output providing said first latch signal;
   a second comparator having a first input receiving said ramp voltage, a second input receiving said positive window voltage, and an output providing said second latch signal.

3. The electronic device of claim 2, wherein:
   said first comparator asserts said first latch signal when said ramp voltage falls to said negative window voltage;
   wherein said second comparator asserts said second latch signal when said ramp voltage rises to said positive window voltage; and
   wherein said latch circuit comprises a set-reset latch having a set input receiving said first latch signal and a reset input receiving said second latch signal.

4. The electronic device of claim 2, wherein said window circuit comprises:
   a first window resistor having a first end coupled to a control node developing said control voltage and having a second end coupled to a positive window node developing said positive window voltage;
   a second window resistor having a first end coupled to said control node and having a second end coupled to a negative window node developing said negative window voltage; and
   a current generator circuit that applies a window current through said first and second window resistors.

5. The electronic device of claim 1, wherein the load includes a processor coupled to a memory.

6. A method of regulating an output voltage, comprising: converting an input voltage to the output voltage using a pulse-width modulation signal to switch voltage applied to an output inductor; detecting a current through the output inductor and providing a current sense signal; providing a control signal indicative of a difference between a target level of the output voltage and a voltage indicative of the output voltage; comparing the control signal with the current sense signal to develop a compare signal and using the compare signal to develop the pulse-width modulation signal; and adjusting the current sense signal based on a difference between the voltage indicative of the output voltage and the reference voltage, wherein said detecting a current through the output inductor comprises developing a ramp voltage on a ramp node that simulates current through the output inductor, and wherein said adjusting comprises converting the difference between the reference voltage and the voltage indicative of the output voltage to an adjust current and applying the adjust current to the ramp node, wherein said developing a ramp voltage that simulates current through the output inductor comprises: discharging a ramp capacitor coupled to the ramp node with a current that is proportional to the output voltage; and charging the ramp capacitor with a current that is proportional to the input voltage only when the pulse-width modulation signal is in an active state.

7. The method of claim 6, wherein said comparing and using comprises:
   comparing the control signal with the current sense signal to develop the compare signal as a reset signal; and
   asserting the pulse-width modulation signal to a first state based on a clock signal, and asserting the pulse-width modulation signal to a second state in response to the reset signal.

8. The method of claim 6, wherein said comparing and using comprises:

developing a positive window voltage that is greater than a control voltage indicative of the control signal, and developing a negative window voltage that is less than the control voltage;

comparing the ramp voltage with the negative window voltage and transitioning the pulse-width modulation signal to an active state when the ramp voltage falls to the negative window voltage; and comparing the ramp voltage with the positive window voltage and transitioning the pulse-width modulation signal to an inactive state when the ramp voltage rises to the positive window voltage.

9. A current mode control regulator providing an output voltage, comprising:

a control circuit that regulates the output voltage based on a reference voltage using current mode control; and a current generator, coupled to a feedback portion of said control circuit, that applies an adjust current to said feedback portion that is proportional to a difference between a voltage indicative of the output voltage and said reference voltage to emulate an AC load resistance at an output of the current mode regulator, wherein said control circuit comprises a current mode hysteretic controller with synthetic current information including a ramp node synthetically replicating current through an output inductor, and wherein said current generator adjusts voltage of said ramp node, and wherein said current generator comprises a transconductance amplifier that generates a current proportional to a difference between said voltage indicative of the output voltage and a reference voltage indicative of a target level of the output voltage, said current mode control regulator further comprising a ramp capacitor coupled to the ramp node that is discharged with a current that is proportional to the output voltage and that is charged with a current that is proportional to an input voltage only when a pulse-width modulation signal is in an active state.

* * * * *